(12) United States Patent
Lilja

(10) Patent No.: US 9,081,926 B2
(45) Date of Patent: *Jul. 14, 2015

(54) SOFT ERROR AND RADIATION HARDENED SEQUENTIAL LOGIC CELL

(71) Applicant: Klas Olof Lilja, Pleasanton, CA (US)

(72) Inventor: Klas Olof Lilja, Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/026,648

(22) Filed: Sep. 13, 2013

(65) Prior Publication Data

US 2014/0019921 A1 Jan. 16, 2014

Related U.S. Application Data

(62) Division of application No. 13/277,135, filed on Oct. 19, 2011, now Pat. No. 8,566,770, which is a division of application No. 12/354,655, filed on Jan. 15, 2009, now abandoned.

(Continued)

(51) Int. Cl.
*G06F 17/50* (2006.01)
*H03K 19/003* (2006.01)
*H03K 19/20* (2006.01)

(52) U.S. Cl.
CPC ........ *G06F 17/5022* (2013.01); *G06F 17/5068* (2013.01); *H03K 19/0033* (2013.01); *H03K 19/00338* (2013.01); *H03K 19/20* (2013.01); *G06F 2217/12* (2013.01)

(58) Field of Classification Search
CPC ............ H03K 19/0033; G06F 17/5022; G06F 17/504; G06F 17/5036; G06F 17/5081; G06F 17/5045
USPC ........... 716/55, 103, 106, 111, 119, 120, 132, 716/136, 139; 326/12, 14
See application file for complete search history.

(56) References Cited

U.S. PATENT DOCUMENTS 5,065,048 A 11/1991 Asai et al.
5,111,429 A 5/1992 Whitaker
(Continued)

FOREIGN PATENT DOCUMENTS

CN 2218426 Y 1/1996
CN 1152798 6/1997
(Continued)

OTHER PUBLICATIONS

Haixia et al., "Design of a Low Power Radiation Hardened 256K SRAM", Solid-State and Integrated Circuit Technology, 2006, ICSICT, 8th International Conference, IEEE, Oct. 23, 2006, pp. 1646-1648.

(Continued)

*Primary Examiner* — Helen Rossoshek
(74) *Attorney, Agent, or Firm* — K&L Gates LLP

(57) ABSTRACT

This invention comprises a layout method to effectively protect logic circuits against soft errors (non-destructive errors) and circuit cells, with layout, which are protected against soft errors. In particular, the method protects against cases where multiple nodes in circuit are affected by a single event. These events lead to multiple errors in the circuit, and while several methods exist to deal with single node errors, multiple node errors are very hard to deal with using any currently existing protection methods. The method is particularly useful for CMOS based logic circuits in modem technologies (.ltoreq.90 nm), where the occurrence of multiple node pulses becomes high (due to the high integration level). It uses a unique layout configuration, which makes the circuits protected against single event generated soft-errors.

4 Claims, 9 Drawing Sheets

Related U.S. Application Data

(60) Provisional application No. 61/011,599, filed on Jan. 17, 2008, provisional application No. 61/011,989, filed on Jan. 22, 2008, provisional application No. 61/068,483, filed on Mar. 7, 2008, provisional application No. 61/123,003, filed on Apr. 5, 2008.

(56) References Cited

U.S. PATENT DOCUMENTS

| | | | |
|---|---|---|---|
| 5,870,332 A | 2/1999 | Lahey et al. | |
| 5,898,711 A | 4/1999 | Buer | |
| 6,127,864 A | 10/2000 | Mavis et al. | |
| 6,278,287 B1 | 8/2001 | Baze | |
| 6,326,809 B1 | 12/2001 | Gambles et al. | |
| 6,433,983 B1 | 8/2002 | Fechner | |
| 6,549,443 B1 | 4/2003 | Jensen et al. | |
| 6,573,773 B2 | 6/2003 | Maki et al. | |
| 6,703,858 B2 | 3/2004 | Knowles | |
| 6,807,081 B2 | 10/2004 | Nii | |
| 6,894,334 B2* | 5/2005 | Sugiura et al. | 257/296 |
| 7,023,235 B2 | 4/2006 | Hoff | |
| 7,075,337 B2 | 7/2006 | Wood et al. | |
| 7,139,190 B1 | 11/2006 | de Jong | |
| 7,215,135 B2 | 5/2007 | Carlson | |
| 7,236,001 B2 | 6/2007 | Fulkerson | |
| 7,289,375 B2 | 10/2007 | Fukui | |
| 7,298,010 B1 | 11/2007 | Ma | |
| 7,310,759 B1 | 12/2007 | Carmichael et al. | |
| 7,327,197 B2 | 2/2008 | Kriz | |
| 7,343,579 B2 | 3/2008 | Coxe et al. | |
| 7,489,538 B2* | 2/2009 | Maki et al. | 365/154 |
| 7,504,703 B2 | 3/2009 | Yoshida | |
| 7,504,850 B2 | 3/2009 | Kuboyama et al. | |
| 7,505,300 B2 | 3/2009 | Namekawa et al. | |
| 7,515,452 B1 | 4/2009 | de Jong et al. | |
| 7,523,422 B2 | 4/2009 | Zhu et al. | |
| 7,529,118 B2 | 5/2009 | Burleson et al. | |
| 7,576,583 B2 | 8/2009 | Kuboyama et al. | |
| 7,620,883 B1 | 11/2009 | Carmichael et al. | |
| 7,627,840 B2 | 12/2009 | Kleinosowski et al. | |
| 7,644,311 B2 | 1/2010 | Lien et al. | |
| 7,679,403 B2 | 3/2010 | Erstad | |
| 7,683,675 B2 | 3/2010 | Mo | |
| 7,733,144 B2 | 6/2010 | Guo et al. | |
| 7,759,995 B2 | 7/2010 | Ishii et al. | |
| 7,761,828 B2 | 7/2010 | Miczo | |
| 7,772,874 B2 | 8/2010 | Rezgui et al. | |
| 7,773,442 B2 | 8/2010 | Kapre et al. | |
| 7,774,732 B2 | 8/2010 | KleinOsowski et al. | |
| 7,818,702 B2 | 10/2010 | Mandelman et al. | |
| 7,864,561 B2 | 1/2011 | Liaw | |
| 7,907,461 B1 | 3/2011 | Nguyen et al. | |
| 7,961,501 B1 | 6/2011 | Ryan | |
| 7,965,540 B2 | 6/2011 | Cannon et al. | |
| 8,042,071 B2 | 10/2011 | Moyer et al. | |
| 8,081,010 B1 | 12/2011 | Whitaker et al. | |
| 8,115,515 B2 | 2/2012 | Roper | |
| 8,191,021 B2 | 5/2012 | Rezgui | |
| 8,207,753 B2 | 6/2012 | Cabanas-Holmen et al. | |
| 8,278,719 B2 | 10/2012 | Morris | |
| 8,468,484 B2* | 6/2013 | Lilja | 716/119 |
| 8,495,550 B2 | 7/2013 | Lilja | |
| 8,566,770 B2* | 10/2013 | Lilja | 716/119 |
| 2007/0050740 A1 | 3/2007 | Jacobi et al. | |
| 2007/0096754 A1 | 5/2007 | Johnson et al. | |
| 2007/0242537 A1 | 10/2007 | Golke et al. | |
| 2008/0158747 A1 | 7/2008 | Voldman | |
| 2009/0044158 A1 | 2/2009 | Lilja | |
| 2009/0184733 A1 | 7/2009 | Lilja | |
| 2011/0175197 A1 | 7/2011 | Furuta | |
| 2012/0185816 A1 | 7/2012 | Lilja | |
| 2013/0038348 A1 | 2/2013 | Lilja | |
| 2013/0162293 A1 | 6/2013 | Lilja | |
| 2013/0227499 A1 | 8/2013 | Lilja | |
| 2014/0157223 A1 | 6/2014 | Lilja | |
| 2014/0184320 A1* | 7/2014 | Allen et al. | 327/565 |
| 2014/0184321 A1* | 7/2014 | Allen et al. | 327/565 |

FOREIGN PATENT DOCUMENTS

| | | |
|---|---|---|
| CN | 2629309 Y | 7/2004 |
| CN | 101919162 B | 12/2013 |
| CN | 101919162 B1 | 12/2013 |
| EP | 1387494 A1 | 2/2004 |
| EP | 1720257 A1 | 11/2006 |
| EP | 1760888 A2 | 3/2007 |
| EP | 2280346 A1 | 2/2011 |
| EP | 2245740 B1 | 3/2014 |
| JP | 2002-373899 A | 12/2002 |
| JP | 2005-101495 A | 4/2005 |
| JP | 2006-339355 A | 12/2006 |
| WO | WO2010123940 A2 | 10/2010 |
| WO | WO2013082611 A2 | 6/2013 |
| WO | WO2014/066402 A1 | 5/2014 |

OTHER PUBLICATIONS

Calin et al., "Upset Hardened Memory Design for Submicron CMOS Technology", IEEE Transactions on Nuclear Science, vol. 43, No. 6, Dec. 1, 1996, pp. 2874-2878.

Amusan et al., "Directional Sensitivity of Single Event Upsets in 90 nm CMOS Due to Charge Sharing", Dec. 2007, IEEE Transactions on Nuclear Science, vol. 54, No. 6, Part 1, pp. 2584-2589.

Amusan et al. "Mitigation techniques for single event induced charge sharing in a 90 nm bulk CMOS process", Published 2011, 46th Annual International Reliability Physics Symposium, IRPS 2008, IEEE, pp. 468-472.

Amusan et al., "Single Event Upsets in a 130 nm Hardened Latch Design Due to Charge Sharing", 2007, 45th Annual International Reliability Physics Symposium, IEEE, pp. 306-311.

Lee et al., "Design Framework for Soft-Error-Resilient Sequential Cells", Dec. 2011, IEEE Transactions on Nuclear Science, vol. 58, No. 6, Part 1, pp. 3026-3032.

Lee et al., "LEAP: Layout Design through Error-Aware Transistor Positioning for soft-error resilient sequential cell design", 2010, International Reliability Physics Symposium, IRPS, IEEE, pp. 203-212.

Wang et al. "Low-Overhead SEU-Tolerant Latches", 2007, International Conference on Microwave and Millimeter Wave Technology, ICMMT, pp. 1-4.

Naseer et al., "DF-DICE: A Scalable Solution for Soft Error Tolerant Circuit Design", 2006, IEEE International Symposium on Circuits and Systems, ISCAS, pp. 3890-3893.

Casey et al., "Single-Event Tolerant Latch Using Cascode-Voltage Switch Logic Gates", Dec. 2006, IEEE Transactions on Nuclear Science, vol. 53, No. 6, pp. 3386-3391.

Blum et al., "Multiple Node Upset Mitigation in TPDICE-Based Pipeline Memory Structures", 2008, 51st Midwest Symposium on Circuits and Systems, MWSCAS, pp. 314-317.

Amusan et al., "Single Event Upsets in Deep-Submicrometer Technologies Due to Charge Sharing", Sep. 2008, IEEE Transactions on Device and Materials Reliability, vol. 8, No. 3, pp. 582-589.

Cannon et al., "Multi-bit Upsets in 65 nm SOI SRAMs", 2008, IEEE 46th Annual International Reliability Physics Symposium, Phoenix, pp. 195-201.

Narasimham et al., "Effects of Guard Bands and Well Contacts in Mitigating Long SETs in Advanced CMOS Processes", Jun. 2008, IEEE Transactions on Nuclear Science, vol. 55, No. 3, pp. 1708-1713.

Naseer et al., "The DF-DICE Storage Element for Immunity to Soft Errors", 2005, IEEE, University of Southern California, pp. 303-306.

Seifert et al., "Multi-Cell Upset Probabilities of 45nm High-k + Metal Gate SRAM Devices in Terrestrial and Space Environments", 2008, IEEE, 46th Annual International Reliability Physics Symposium, Phoenix, pp. 181-186.

Kim, Yong Tae and Sun II Shim, "Electrical analysis of Metal-Ferroelectric-Semiconductor Field-Effect Transistor with SPICE com-

(56) References Cited

OTHER PUBLICATIONS bined with Technology Computer-Aided Design", Journal of the Microelectronics & Packaging Society, 2005, vol. 12, No. 1, pp. 59-63. (English abstract).
Lee, Hoong-Joo and Jun-Ha Lee, "Computer Modeling of Impurity Diffusion in Poly-silicon for Display Devices", Journal of the Korea Academia-Industrial Cooperation Society, 2004, vol. 5, No. 3, pp. 210-217. (English abstract).
Benedetto et al., "Heavy Ion-Induced Digital Single-Event Transients in Deep Submicron Processes", IEEE Transactions on Nuclear Science, vol. 51, No. 6, Dec. 2004, pp. 3480-3485.
Mitra et al., "Combinational Logic Soft Error Correction", International Test Conference, 2006, ITC, IEEE International, pp. 1-9.
Gadlage et al., "Modeling and verification of single event transients in deep submicron technologies", 2004, IEEE 42nd Annual International Reliability Physics Symposium Proceedings, pp. 673-674.
Nicolaidis, M. "Design for soft error mitigation", IEEE Transactions on Device and Materials Reliability, Sep. 2005, vol. 5, Issue 3, pp. 405-418.
ACCURO™ User's Manual, Robust Chip, 2007, 133 pages.
Baumann, Robert C., "The Impact of Technology Scaling on Soft Error Rate Performance and Limits to the Efficacy of Error Correction", IEDM, 2002, pp. 329-332.
Baumann, Robert C., "Radiation-Induced Soft Errors in Advanced Semiconductor Technologies", IEEE Transactions on Device and Materials Reliability, Sep. 2005, vol. 5, No. 3, pp. 305-316.
Lilja, Klas, "Simulation Techniques for SEEs and Single Event Multiple Upset (SEMU) in ≤ 90 nm Technologies", Robust Chip Inc., 2007, Single Event Effects Symposium, pp. 1-4.
Nguyen et al., "Chip-Level Soft Error Estimation Method", IEEE Transactions on Device and Materials Reliability, Sep. 2005, vol. 5, No. 3, 365-381.
Seifert et al., "Radiation-Induced Soft Error Rates of Advanced CMOS Bulk Devices", 2006, 44th Annual International Reliability Physics Symposium, San Jose, pp. 217-225.
D'Alessio et al., "Design of a Nanometric CMOS Memory Cell for Hardening to a Single Event with a Multiple Node Upset", 2012, IEEE Transactions on Device and Materials Reliability, pp. 1-6.
Office Action mailed Jan. 27, 2012 in U.S. Appl. No. 12/763,139.
Office Action mailed Apr. 3, 2012 in U.S. Appl. No. 12/763,139.
Office Action mailed Aug. 17, 2012 in U.S. Appl. No. 12/763,139.
Notice of Allowance mailed Mar. 29, 2013 in U.S. Appl. No. 12/763,139.
Applicant-Initiated Interview Summary mailed Mar. 29, 2013 in U.S. Appl. No. 12/763,139.
Office Action mailed Dec. 1, 2010 in U.S. Appl. No. 12/101,808.
Notice of Non-Compliant Amendment mailed May 6, 2011 in U.S. Appl. No. 12/101,808.
Office Action mailed Jun. 21, 2011 in U.S. Appl. No. 12/101,808.
Notice of Abandonment mailed Feb. 1, 2012 in U.S. Appl. No. 12/101,808.
First Action Interview Pilot Program Pre-Interview Communication mailed Jan. 22, 2013 in U.S. Appl. No. 13/277,135.
Applicant-Initiated Interview Summary mailed Apr. 4, 2013 in U.S. Appl. No. 13/277,135.
First Action Interview Office Action Summary mailed Apr. 4, 2013 in U.S. Appl. No. 13/277,135.
Notice of Allowance mailed Jun. 20, 2013 in U.S. Appl. No. 13/277,135.
Office Action mailed Feb. 25, 2011 in U.S. Appl. No. 12/354,655.
Office Action mailed Apr. 21, 2011 in U.S. Appl. No. 12/354,655.
Notice of Non-Compliant Amendment mailed Sep. 7, 2011 in U.S. Appl. No. 12/354,655.
Office Action mailed Nov. 3, 2011 in U.S. Appl. No. 12/354,655.
Examiner-Initiated Interview Summary and Notice of Abandonment mailed Jun. 11, 2012 in U.S. Appl. No. 12/354,655.
Notice of Allowance mailed Feb. 22, 2013 in U.S. Appl. No. 13/425,231.
U.S. Appl. No. 13/463,704, filed May 3, 2012.
Office Action mailed Jun. 12, 2013 in U.S. Appl. No. 13/463,704.
Office Action mailed Jun. 17, 2013 in U.S. Appl. No. 13/463,706.
U.S. Appl. No. 13/692,800, filed Dec. 3, 2012.
Office Action mailed Jun. 4, 2013 in U.S. Appl. No. 13/463,688.
Partial European Search Report for EP 13176436.7 dated Dec. 13, 2013.
U.S. Appl. No. 14/060,162, filed Oct. 22, 2013.
Office Action mailed Aug. 8, 2014 in U.S. Appl. No. 14/026,648.
Advisory Action mailed Oct. 20, 2014 in U.S. Appl. No. 14/026,648.
Notice of Allowance mailed Dec. 8, 2014 in U.S. Appl. No. 14/026,648.
Office Action mailed May 29, 2014 in U.S. Appl. No. 14/060,162.
Office Action mailed Sep. 22, 2014 in U.S. Appl. No. 14/060,162.

\* cited by examiner

☐ = NWELL REGION
▦ = NWELL CONTACT
▤ = PWELL CONTACT

PWELL/ SUBSTRATE REGION
(SURROUNDING
THE NWELL REGIONS)

▨ = GATE CONTACT (for the mosfet who's drain is adjacent)
▩ = GATE CONTACT (may have a different gate length than the green gates)
▒ = GATE CONTACT (may be omitted), but adjacent drains are physically separate)

☐ = NWELL REGION             PWELL/ SUBSTRATE REGION
▥ = NWELL CONTACT            (SURROUNDING
▤ = PWELL CONTACT            THE NWELL REGIONS)
▨ = GATE CONTACT (for the mosfet who's drain is adjacent)
▧ = GATE CONTACT (may have a different gate length than the green gates)
▢ = GATE CONTACT (may be omitted), but adjacent drains are physically separate)

SOFT ERROR AND RADIATION HARDENED SEQUENTIAL LOGIC CELL

CROSS REFERENCE TO RELATED APPLICATIONS

This application is a divisional application, claiming the priority of co-pending U.S. application Ser. No. 13/277,135, Entitled: "Layout Method for Soft-Error Hard Electronics, and Radiation Hardened Logic Cell", filed Oct. 19, 2011, which is a divisional application, claiming the priority of U.S. application Ser. No. 12/354,655, Entitled: "Layout Method for Soft-Error Hard Electronics, and Radiation Hardened Logic Cell", filed Jan. 15, 2009, also claiming priority to U.S. application Ser. No. 61/011,599, Entitled: "Layout Methodology for Soft-Error Hard Electronics", filed Jan. 17, 2008, also claiming priority to U.S. provisional application No. 61/011,989, Entitled: "Robust Cell Layout Synthesis Methodology for Soft-Error Hard Electronics", filed Jan. 22, 2008, also claiming priority to U.S. Provisional application No. 61/068,483, Entitled: "Circuit and Layout for a Radiation Hard Sequential Circuit Element", filed Mar. 7, 2008, also claiming priority to U.S. provisional application No. 61/123,003, Entitled: "Design Technique, and Layout and Circuit Configurations, for Radiation Hardening of Logic Circuits", filed Apr. 5, 2008, which are incorporated herein by reference.

GOVERNMENT SUPPORT

This invention was made with Government support under W31 P4Q-06-C-0097 awarded by DARPA and FA9451-06-C-03 83 awarded by DTRA. The Government has certain rights in the invention.

BACKGROUND OF THE INVENTION

1. Field of the Invention

This invention comprises a layout method to effectively protect logic circuits against soft errors (non-destructive errors) and circuit cells, with layout, which are protected against soft errors. In particular, the method protects against cases where multiple nodes in circuit are affected by a single event. These events lead to multiple errors in the circuit, and while several methods exist to deal with single node errors, multiple node errors are very hard to deal with using any currently existing protection methods. The method is particularly useful for CMOS based logic circuits in modern technologies (.ltoreq.90 nm), where the occurrence of multiple node pulses becomes high (due to the high integration level). It uses a unique layout configuration, which makes the circuits protected against single event generated soft-errors.

The problem of soft errors generated by single event transients (and single event upsets) is expected to increase drastically in ultra-deep submicron (.ltoreq.90 nm) technologies. Of particular significance is that logic circuits are expected to become much more sensitive to radiation generated soft-errors and possibly surpass memory as the major source of single event errors. Furthermore, the generation rate of multiple errors, multi pie bit upsets (MBU), single-event multiple upset (SEMU) increases.

The main reason for this is that, with a higher feature integration and higher frequencies, the spatial distribution and pulse length of a single event transient (SET) becomes relatively larger, increasing the probability that an SET pulse is latched-in as a (soft-) error, or that SET pulses are generated simultaneously on several circuit nodes by one single event.

The problem with increasing soft-error rates is further complicated by the escalating cost of semiconductor design and manufacturing. The high cost involved in developing and maintaining a semiconductor FAB makes it highly desirable to use standard commercial semiconductor manufacturing also for applications that require a high radiation tolerance. Hence, there is a strong drive to develop efficient and robust radhard-by-design (RHBD) techniques for these applications.

Furthermore, the design process is also becoming very complex and expensive, and it would be highly desirable to be able to re-use standard design IP and libraries as much as possible for radhard applications.

2. Prior Art

Current radhard-by-design technology for single event errors include triplication (triple mode redundancy, TMR) or duplication (e.g., built-in soft-error resilience, BISER). These circuits carry two or more redundant copies of a signal, and use some form of voting, or filtering, circuitry to determine the correct signal among the redundant signals. Filtering preventing a signal to pass in the case that one of the redundant signals is wrong (by comparing the value of the redundant signals), and voting circuits selects the correct signal from the majority among several (3 or more) redundant signals.

These techniques generate undesirable power and area overhead, and current versions of these techniques cannot handle MBUs or SEMUs. Error correction codes, ECC, for memory, which also (loosely) could be classified as RHBD, is more efficient than duplication/triplication and can, with additional overhead, handle multiple errors in memory circuitry. However, the application of a corresponding error correction to logic circuits is very limited and application specific (e.g., selective parity check or insertion of specialized checking circuit IP).

State-of-the art for layout techniques for soft-error hard design mainly consist of simple spacing and sizing, and in adding additional contacts.

BRIEF SUMMARY OF THE INVENTION

A radiation generated single event (soft-) error (SEE) occurs when the charge, generated in the semiconductor material by one or more (e.g. secondary) charge particles, is collected by contact areas on the semiconductor substrate. This leads to current pulses on the circuit nets, connected to these contact areas, which, in their turn, cause voltage pulses in the circuit which can upset a sequential element (latch, flip-flop) or propagate through combinational logic and be latched in as errors at the next sequential element in the circuit.

This invention comprises a unique new layout method, which takes advantage of the overall circuit response to a single event effect, and, furthermore, comprises circuit cells, with layout, which are protected against soft errors. The method uses an arrangement of critical contact areas in such a way that single event pulses in the circuit, that are generated on multiple nodes, act to oppose each other and hence cancel (or greatly reduce the effect of the single event). In the case that a primary and secondary, circuit is used to maintain, or process the signal in a circuit, addition rules, described in section 4, are used, so that no possibility remains that a error is generated in both primary and secondary circuit, and hence that the combination of primary and secondary circuit will be fully error free.

BRIEF DESCRIPTION OF THE DRAWINGS AND FIGURES

Table 1. The state for the nodes in a circuit that uses a primary (nodes n1, n2) and secondary (nodes n3, n4) circuit for storage or processing of the state.

Figure 4:
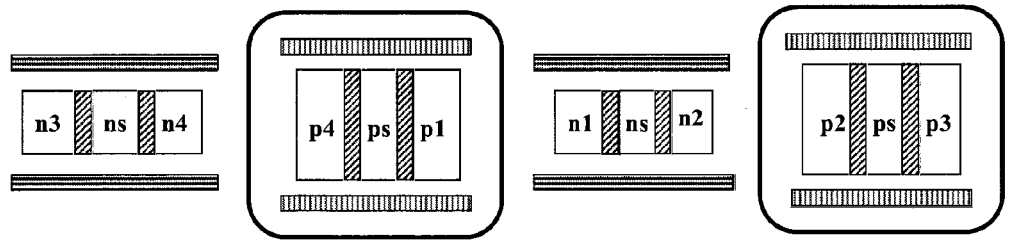

FIG. 4 illustrates one embodiment of a first preferred layout arrangement for the layout of the DICE latch cell. ns/ps are the source contacts for the two mosfets whose drains are adjacent. p1-p4 and n1-n4 are the pMOSFET drains and the nMOSFET drains of the 4 main storage nodes, respectively. Any cyclic simultaneous permutation of the n and p nodes will be equivalent (and part of the invention). The mosfets can be placed in separate active areas, or the adjacent n and p nodes can be placed in the same active area. The MOSFET sources can be placed in the lie of the drains or in the direction vertical to the line of the drain nodes. The well contacts can be placed on either side only, or also surround the adjacent node pairs. The nodes can also be arranged in a different order subject to the following rules: two adjacent n-drains, or two adjacent p-drains are always an odd/even pair (e.g., p1 & p2, or n2 & n3), adjacent n-drain to p-drain are always an odd/odd or an even/even pair (e.g., n2 & p2 or p3 & n1).

Figure 5:
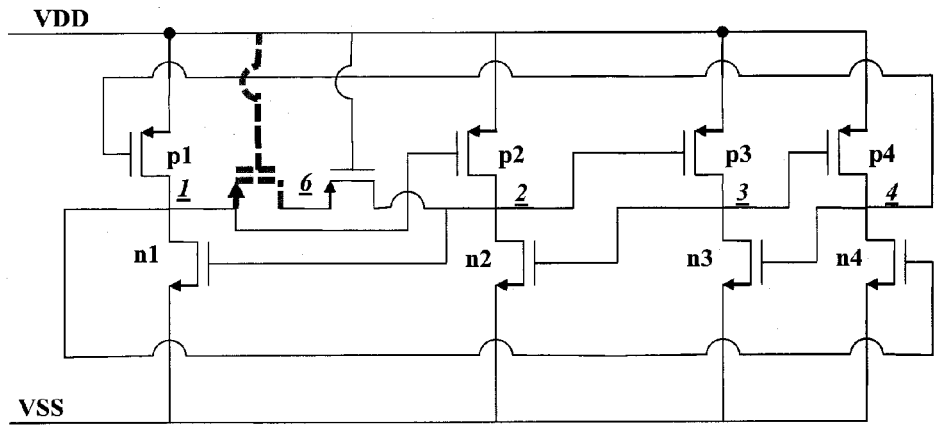

FIG. 5 illustrates one embodiment of a net-list corresponding to the second preferred arrangement. The yellow MOSFET may or may not be included, as long as node 6 is connected to drain 6a in FIGS. 5, and p1 and 6a are physically separate.

Figure 6:
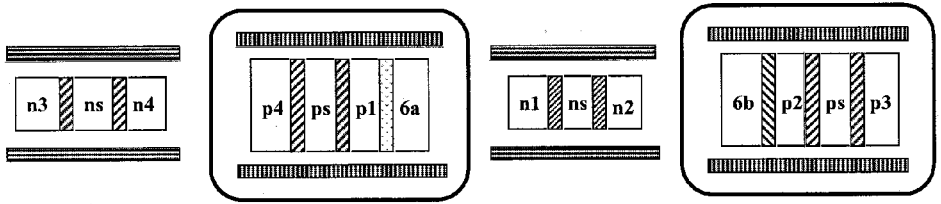

FIG. 6 illustrates one embodiment of a second preferred layout arrangement. ns/ps are the source contacts for the two mosfets whose drains are adjacent. Node 6a and 6b are connected. The yellow gate adjacent to node 6a may or may not be included (both variants included in the claims), but p1 and 6a are physically separate. The layout derives from the layout in FIG. 1, and the same variants with respect to node permutations, active, source, and well contact arrangements apply.

Figure 1:
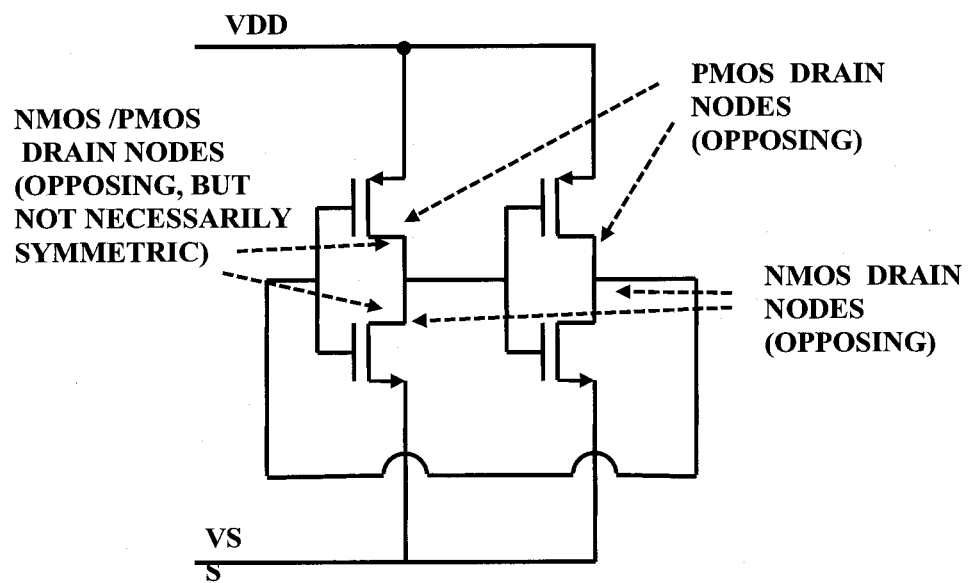
FIG. 1 illustrates one embodiment of primary opposing nodes in a latch cell.
Figure 7:
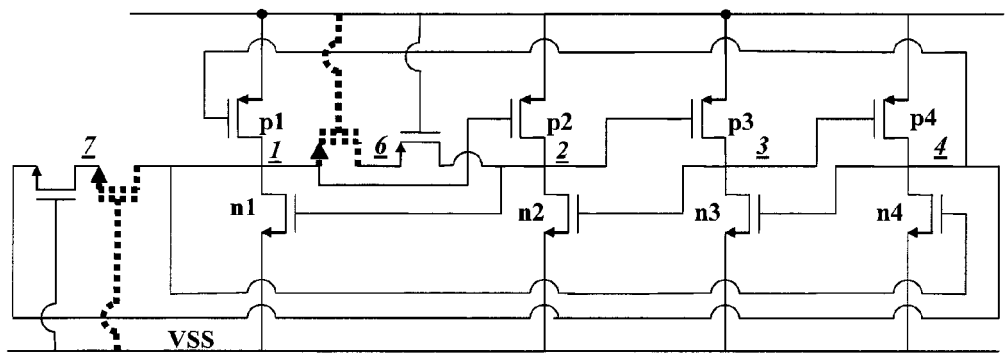

FIG. 7 illustrates one embodiment of a net-list corresponding to the third preferred arrangement. The yellow MOSFET may or may not be included, as long as node 6 is connected to drain 6a in FIGS. 4, and p1 and 6a are physically separate, and node 7 is connected to drain 7a in FIGS. 4, and 1 and 7a are physically separate.

Figure 8:
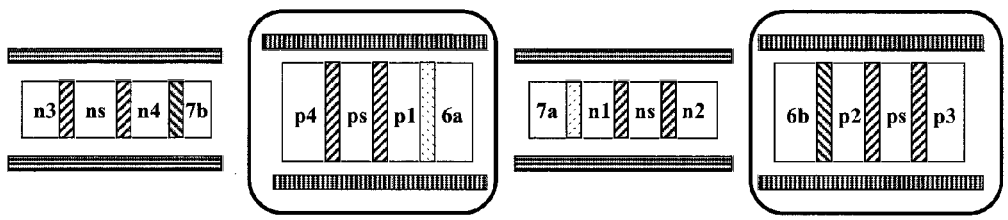

FIG. 8 illustrates one embodiment of a third preferred layout arrangement. ns/ps are the source contacts for the two mosfets whose drains are adjacent. Node 6a-6b are connected, as are node 7a/7b. The yellow gate adjacent to node 6a and 7a may or may not be included (both variants included in the claims), but the adjacent drain areas are physically separate. The layout derives from the layout in FIG. 1, and the same variants with respect to node permutations, active, source, and well contact arrangements apply.

Figure 9:
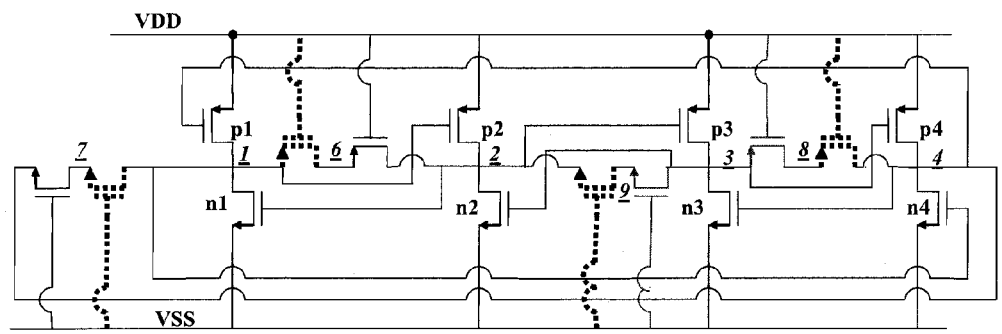

FIG. 9 illustrates one embodiment of a net-list corresponding to the fourth preferred arrangement. The yellow MOSFET may or may not be included, as long as node 6 is connected to drain 6a, 7 to 7a, 8 to 8a, and 9 to 8a in FIGS. 8, and 6a, 7a, 8a, 9a are physically separate from their adjacent main drain node.

Figure 10:
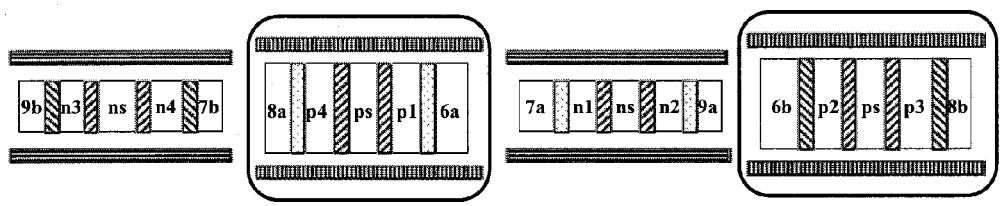

FIG. 10 illustrates one embodiment of a fourth preferred arrangement. ns/ps are the source contacts for the two mosfets whose drains are adjacent. Node 6a/6b, 7a/7b, 8a/8b, and 9a/9b are connected. The yellow gates adjacent to nodes 6a, 7a, 8a, 9a may or may not be included (both variants included in the claims), but nodes 6a, 7a, 8a, 9a are physically separate from their adjacent MOSFET drains. The layout derives from the layout in FIG. 1, and the same variants with respect to node permutations, active, source, and well contact arrangements apply. Naturally the claims also cover the various additional variants where any combinations of the extra nodes 6a/6b, 7a/7b, 8a/8b, 9a/9b have been included or omitted.

Figure 11:
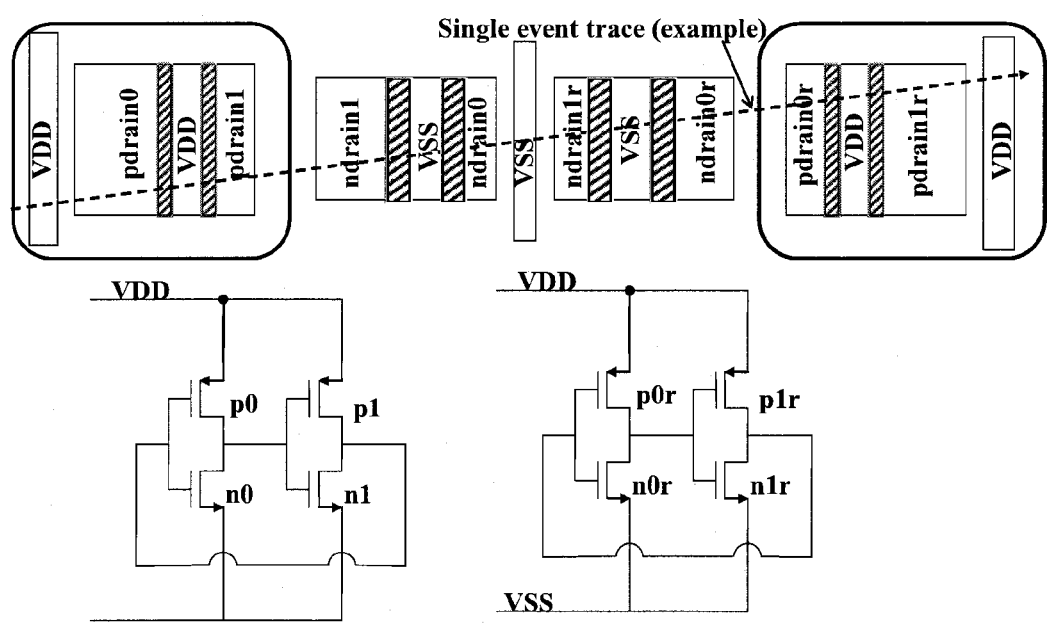

FIG. 11 illustrates one embodiment of a circuit schematic and layout for duplicated latch cells (e.g., for BISER) using placement and sizing to ensure complete hardness against single and multiple node single event effects. For a single event affecting several nodes, the primary latch can only be upset when node 1 is HIGH, and the redundant latch can only be upset when node 1 ($r$) is LOW. Hence, any single event that affects both latches, can only upset one of the two latches in the BISER configuration, and therefore, cannot generate an error.

Figure 12:
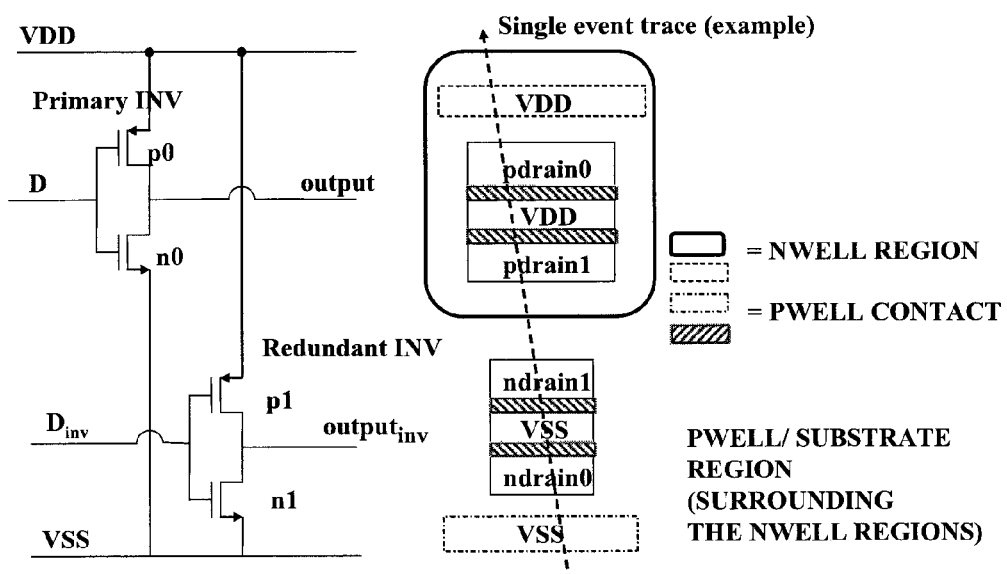

FIG. 12 illustrates one example of a duplicated circuit of claims 9 AND 10. In a duplicated inverter here the redundant and primary nodes carry opposite states, error signals on both primary and redundant nodes can be generated if both ndrain0 and pdrain1 are affected (if D is high) or if both ndrain1 and pdrain0 are affected (D low). By placing the nodes such, that if a particle trace goes through two nodes that can cause an error transient on both primary and redundant output, then the trace also passes through the other nodes ad the pulse on one of the nets is suppressed. For example, consider the trace in the figure; if node 0 is high, the charge collected on ndrain0 will pull node 0 low (error transient), the charge collected on node pdrain1 will pull node 1 high, however, the charge collected o node ndrain1 will pull node 1 low, opposing the effect on pdrain1, and keeping node 1 low (i.e., preventing the transient on node 1). If node 0 is low, the charge collected on node ndrain1, will pull node 1 low (error transient), however, the charge collected at ndrain0, will keep node 0 low (i.e., preventing the transient on node 0). It should be pointed out that in the general case there will be some pulses on all nodes, but that it will always hold true that a full swing pulse (a transient that can propagate) only can be generated on one, and one only, of the duplicated nodes.

Figure 13:
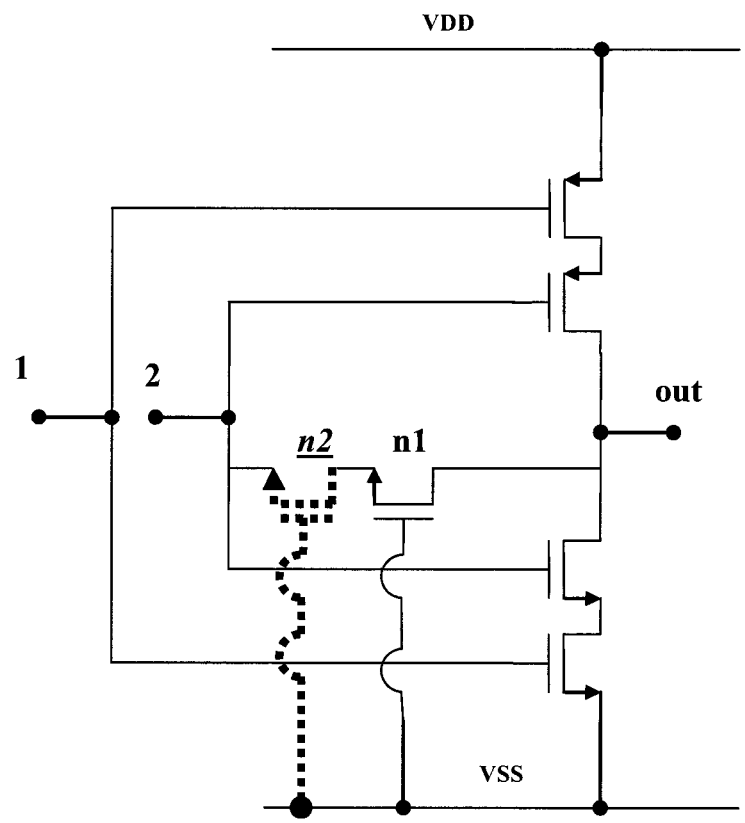

FIG. 13 illustrates one embodiment of a protective device for a c-element filtering circuit.

DETAILED DESCRIPTION OF THE INVENTION AND HOW IT WORKS

This invention comprises a unique new layout method, which takes advantage of the overall circuit response to a single event effect. It also includes specific circuit cells with layout, which have been constructed in accordance with the new layout method.

A radiation generated single event (soft-) error (SEE) occurs when the charge, generated in the semiconductor material by one or more (e.g. secondary) charged particles, is collected by contact areas. The contact areas are the low resistivity regions on, or in, the semiconductor substrate, which are connected to a net in the circuit, e.g., the source and drain areas in a MOSFET technology. A circuit net (or node) refers to a part of the circuit, connected by low resistivity regions (metal), which maintains a certain voltage value (referred to as the voltage state of the net) throughout its' extent. A net can be connected to any number of contact areas.

The charge collected by contact areas during a single event, leads to current pulses in the circuit, which, in their turn, cause a change in the voltage of the circuit nets, connected to these contact areas, i.e., a voltage pulse in the circuit. These pulses can upset a sequential element (latch, flip-flop) or propagate through combinational logic (i.e., a set of digital logic gates) and be latched in as errors at the next sequential element in the circuit.

The effect of a single event on the voltage on the circuit net, is different for different contact areas, e.g., a single event can have the effect of increasing the voltage on the net connected to the contact area, or decreasing it, depending on where the contact areas are located in substrate, and how they are connected to the circuit. The method in this invention uses an arrangement of contact areas in such a way that single event generated pulses in the circuit, that occur on multiple contact areas, acts to oppose each other, with respect to the effects they have on the voltage of the circuit nets, and hence cancel (or greatly reduce the effect of the single event).

The method also comprises an adjustment the strength of the effect a single event has on the voltage of the circuit nets, when this is desirable to achieve the desired total effect on the circuit. This adjustment can be achieved by changing the sizes of the contact areas, and by changing their positions relative to other components in the layout.

The method can be applied to sequential logic elements (latches, flip-flops, memory cells), to combinational logic (a connection of one or more digital logic gates), or to analog circuit cells.

In the following two section details of two specific ways to apply the method are described. The first, section 4.1, uses a placement, and strength adjustment, such that the single event effects, on several contact areas, cancel out each other, in terms of their effect on the circuit nets they are connected to. The second, section 4.2, uses a placement, and strength adjustment, such that two, or more, redundant nets in the circuit, are affected differently by a single event, in such a way that a single event cannot simultaneously change their voltage state on several of the redundant nets.

A. Layout Method Using Symmetric Arrangements—Method 1

The key steps in method one of the invention are:

1. Identify which contact areas have opposing effects on the circuit nets when they are simultaneously affected by a single event 2. Place these nodes in the layout next to each other, and in a fully symmetric way with respect to other adjacent contact areas a. In particular in a CMOS technology the contact are configured in a symmetric (equivalent) position with respect to well junctions and well contacts b. If the two contact areas are part of a sequential element (e.g., a latch), this arrangement ensures that these two nodes cannot be upset by a single event that affects both areas, i.e., an event which has an extended charge (e.g., as generated by a charged particle passing through) which is in such a direction that it affects both these nodes. c. If nodes are part of a combinational element, the arrangement ensures that the generated output pulse is greatly suppressed, when the generation single event affects both nodes, i.e., an event which has an extended charge (e.g., as generated by a charged particle passing through) which is in such a direction that it affects both these nodes.

3. In an element using additional protective circuitry (redundant nets), place the contact areas of the redundant nets in a direction, which is such that when the charge from one single event effects both primary, and redundant nets, it is in the direction which is such that it always also affects both opposing nodes in either the primary or the secondary circuit, or that it affects the opposing node of both primary and secondary circuit.

Specifically for CMOS technology, step one and two above would use the following to characterize the effect of a single event on a source or drain contact area: a. When an n-drain (or source) is affected by a single event, the effect of the single event is to reduce the voltage on the net connected to this contact area, i.e., if the node is high is will tend to switch the voltage, when the node is low, it will not tend to switch the voltage. b. When an n-drain (or source) is affected by a single event, the effect of the single event is to reduce the voltage on the net connected to this contact area, i.e., if the node is high is will tend to switch the voltage, when the node is low, it will not tend to switch the voltage.

Also, specifically for a CMOS technology, step 3 above, would use the following rules for two nodes, each connected to a net carrying redundant signals (primary and secondary nets): a. When two n-drains (or sources), one connected to the primary net and one to the secondary net, are affected by a single event, and they always have opposite voltage states, then only one of the primary/secondary nets can be upset (i.e., change its' voltage). b. When two p-drains (or sources), one connected to the primary and one to the secondary net, are affected by a single event, and they always have opposite voltage states, then only one of the primary/secondary circuits can be upset. c. When an n-drain (or source) from one net, and a p-drain (or source) from the other net is affected, are affected by a single event, and the nets connected to these drains (sources) always have the same voltage state, then only one of the primary/secondary nets can be upset.

B. Layout Method Using Asymmetric Arrangements—Method 2

For the case of an element that uses primary and redundant nets to store the state, (i.e., the voltage or signal). an alternative to synthesizing a layout where single event effects cancel out each other, is to deliberately let one of the contact areas be stronger with respect to single event charge collection. This contact area will then always determine the outcome of a single event in on the connected net (e.g., for a p-drain it would always end up HIGH (at Vdd)). When there are four nets that store the state (2 primary nets, two redundant nets), and we make sure that net connected to the contact areas that is made dominant in the primary circuit part, stores the opposite state to the net connected to the contact area that is made dominant in the redundant circuit part, then only one of the two redundant circuit parts can be upset by an event that affects both circuit parts. Using this variant, the robust cell synthesis methodology would be as follows:

For designs that use primary and redundant nets to store a state: a. Identify which contact areas have opposing circuit effects when they are simultaneously affected by a single event (in the primary as well as the redundant part) b. Place these nodes in the layout next to each other, and make one of the nodes dominant with respect to a single event (e.g., by making the drain area larger, and changing the distance to the well-junction and the well-ties). c. Make sure that the net connected to the dominant contact area of the primary circuit part, stores the opposite state to the net connected to the dominant contact area in the redundant circuit part. d. Place the primary and redundant contact areas, relative to each other, in such a way that a single event the affects both the primary and redundant circuitry, also always affects both the dominant and the non-dominant nodes in the primary and in the redundant part. (i) In this way, either the primary or the redundant part will be in a state where the dominant node will make sure this circuit part cannot be upset (i.e. change its state or voltage). Hence, in any situation only ONE of the redundant parts can be upset by a single event.

C. Discussion, Clarification, and Specific Circuit Cells

In a basic sequential logic circuit element (latch, sram-type memory cell, etc.) there are two main nets that maintain the state. These will always have opposite state (voltage). FIG. 1 shows the schematics of the fundamental components of a latch circuit implemented in a CMOS technology. In this latch, each of the two (main) net is connected to two contacts areas in the layout (the nmos device drain and the pmos drain).

In this configuration the contact areas that will have opposing effects with respect to the state of the latch, when affected by the same single event, can be identified as (step 1 above): a. A single event that affects both pmos drains will have opposing effects on the state of the latch b. A single event that affects both nmos drains will have opposing effect on the state of the latch b. A single event that affects both nmos and pmos drain of the same node will have opposing effect on the state of the latch.

Figure 2:
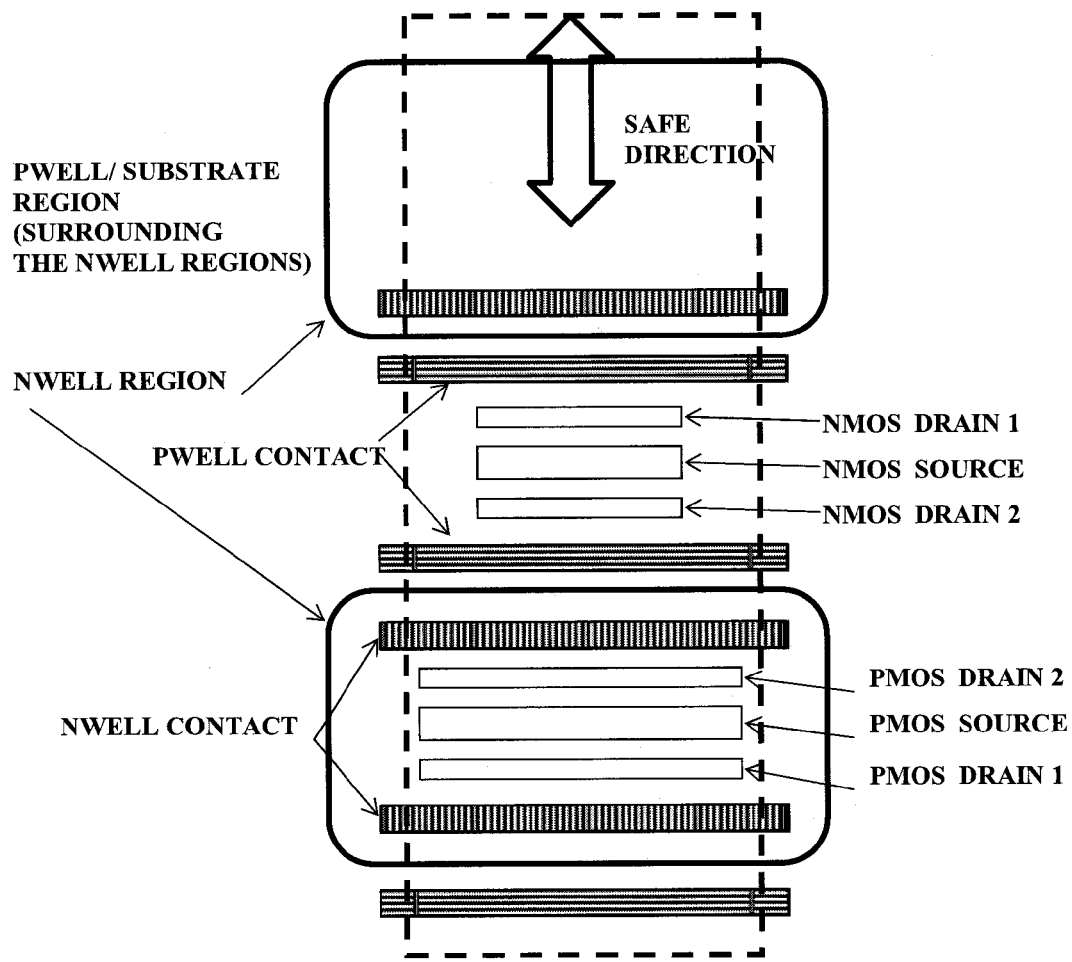
FIG. 2 illustrates one embodiment of a principal arrangement of opposing nodes of a latch circuit.

In the symmetric method, we arrange the layout such that drains, with opposing effects, are placed next to each other, in a symmetric arrangement (i.e. with respect to symmetric and with respect to the surrounding layout, and having the same shape). This is step 2 in the methodology number 1 above. FIG. 2 shows such an arrangement where we have utilized the first two of the opposing contact area identifications above. We now have a latch which cannot be upset if the single event has such a directions that is passes the two nets of the circuit 1.

Step 3 in methodology number 1, as well as method number 2, concerns the case when an additional (redundant) circuit (here a latch) is available. In a circuit configuration that uses two latches to maintain the states, there will be 4 main nodes, n1, n2, from the primary latch, and n3, n4, from the secondary latch. The nodes from one latch will be in opposite states, and, during correct circuit operation, each node in the primary latch will always have the same state as one node in the secondary latch. This situation is shown in table 1, where n1 and n3 maintain the same state, and n2 and n4 maintain the same state.

According to step 3, the nodes of the second latch are now placed, with respect to the first latch, such that when an extended event occurs that affects both latches, it will be in a direction which affects both opposing nodes in each individual latch, or at least in one of them. FIG. 11 shows such an arrangement, where the method with dominating nodes (methodology 2 above) has been used, and the two latches have been placed in such a way relative to each other that at the most, one of the latches can be upset, by any single event, but not both.

The same situation is the same also for other sequential elements (e.g., memory cells) and the method applies to these elements as well. The method also applies to elements which uses more than 2 nodes to maintain the state, as well as non-sequential elements with a primary and secondary redundant net.

TABLE-US-00001 TABLE 1 The state for the nodes in a circuit that uses a primary (nodes n1, n2) and secondary (nodes n3, n4) circuit for storage or processing of the state. Node: n1 n2 n3 n4 State 0 0 1 0 1 State 1 1 0 1 0

To extract the correct signal from the two, or more, redundant nets, a filtering, or voting circuit is used. The filtering ensuring that at any time where one of the redundant nets is wrong (e.g., for the redundant nets carrying the same voltage state; if the voltage states differ) the signal is not allowed to pass through the filtering circuit. The Built-In Soft Error (BISER) design [Mitra2005] is an example of such a configuration. A voting circuit, being used on at least 3 redundant circuit, performs a vote between the voltage states of the redundant nets. Triple mode redundancy (TMR) configurations use this type of redundancy.

Figure 3:
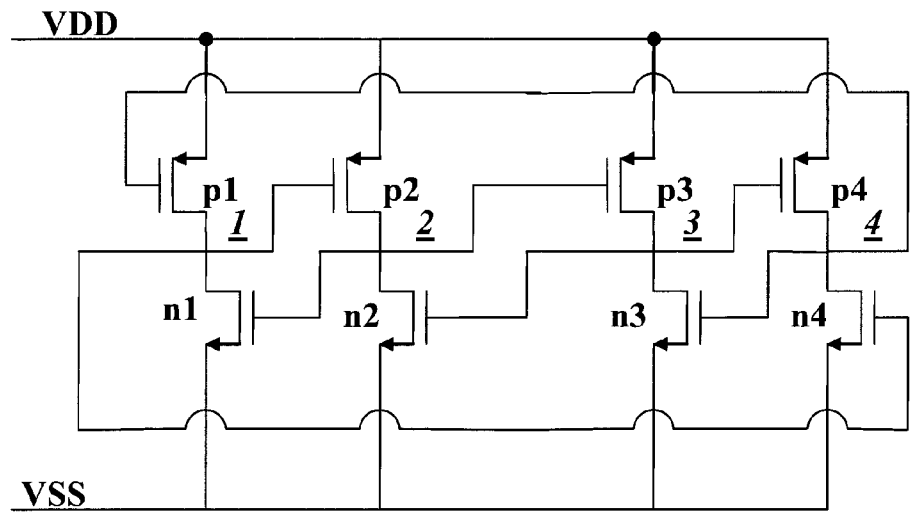
FIG. 3 illustrates one embodiment of a basic netlist for the DICE latch cell (prior art [Nic05]) with nodes 1-4. p1-p4 and n1-n4 are the pMOSFET drains and the nMOSFET drains, respectively.

This invention also comprises several specific DICE cells, created using the layout method. The DICE (Dual Interlocked Cell) latch [Nic2005], the circuit of which is shown in FIG. 3, also uses four nets to store the circuit state, but as can be seen in FIG. 3, they are not connected as two separate latches, but in an interlocked way.

The principal arrangement of the 4 storage nets, of the DICE cells in this inventions, is that the contact areas of the nets are placed along one direction (e.g., FIG. 4), and that they have a certain order, than minimizes or removes the effect of the single event, and hence reduces or removes the possibility that the storage element can be upset by a single event. The first variant (variant 1) is shown in FIG. 4. In this variant the MOSFET pairs have been placed in the same active area with a common MOSFET source contact in-between. However, they can also be placed in separate active areas, using separate sources contacts, and they can also be oriented so that the sources are perpendicular to the direction of the drain nodes.

In variants 2-4 (FIGS. 5-10) protective nodes have been added. They act to protect certain sensitive node-pairs and are not (necessarily) active during normal circuit operation. However, they can also be used as active devices connecting their gates to other storage nodes. For example, while variant 1 is much more robust than the normal layout (which does not have other nodes in between the sensitive node pairs), there are still some single event sensitivity remaining, the main being for the node pair p1-n2. By extending variant one as shown in FIGS. 5-6, the node pair p1-n2 is also protected. This is variant 2. The most sensitive node pair in variant 2 is the n1-p4 node pair, this pair is protected with the extension in variant 3 (FIGS. 7-8). Finally the latch can be made symmetric by adding additional protective nodes. A fully symmetric arrangement of protective nodes is shown in FIGS. 9-10 (fourth variant).

The addition of additional protective MOSFETs has a general application to circuits which uses redundant nets. In the same way as in the case of the DICE circuit, they can be used to keep the state of a circuit node which becomes floating (not connected to the power, i.e., to VSS or VDD) during a single event. Floating nets become very sensitive to the single event charge, their voltage state can change very easily (i.e., even by very weak interaction with the single event). The additional protective devices, even if they just turn on partially during the single event, will make the nodes, that become floating during a single event, much more stable. Another (not DICE) example of the addition of such protective devices for a c-element filtering circuit is shown in FIG. 13.

The invention also comprises a combinational circuit where all, or some of the nets have been duplicated, in such a way that there is one (primary) net that carries the signal, and a second (redundant) net carries the inverse of the signal on the primary net (i.e., when the voltage on the primary net is high, the voltage on the redundant net is always low, and vice versa), and where, in accordance with the layout method, the contact areas of the primary and redundant net, are placed in such a way that when a single event affects both nets, a voltage pulse can only be generated on one of the nets, but not on both. For this type of duplicated combinational circuit, a filtering also needs to be applied to the outputs (at some point before the signal is latched into a single sequential element), which prevents propagation of a signal, unless both nets have their correct state (i.e., one being the inverse of the other).

Alternatively sequential elements can also be duplicated, and an error detection and correction added at some point in the circuit (an error being identified by comparing the signal on the two redundant nets). This type of duplicated combinational circuit is shown in FIG. 12.

I claim:

1. A sequential logic cell comprising:
   four inverter circuits, each of the four inverter circuits comprising one p-type MOSFET having a gate, one n-type MOSFET having a gate, and one output, wherein the four inverter circuits are connected as a Dual Interlocked Cell (DICE), wherein for each inverter circuit, the gate of the p-type MOSFET is coupled to the output of a first of three remaining inverter circuits and the gate of the n-type MOSFET is coupled to the output of a second of the three remaining inverter circuits, wherein the first and second inverter circuits are different;
   wherein the DICE comprises four nets, wherein each of the inverter outputs is coupled to one of the four nets, wherein a first net and a second net comprise a voltage state, and wherein a third net and a fourth net comprise an inverse voltage state, and wherein each net comprises a p-type drain contact area and an n-type drain contact area;
   wherein each of the p-type contact areas and the n-type contact areas are placed along a line, wherein the line comprises a plurality of adjacent contact areas comprising a first contact area and a second contact area;
   wherein for each pair of adjacent contact areas, if a first adjacent contact area and a second adjacent contact area both comprise p-type drain contact areas or both comprise n-type drain contact areas, the first adjacent contact area and the second adjacent contact area are coupled to nets comprising opposite voltage states; and
   wherein for each pair of adjacent contact areas, if the first adjacent contact area and the second adjacent contact area comprise one p-type drain contact area and one n-type drain contact area, the first adjacent contact area and the second adjacent contact area are coupled to nets comprising similar voltage states.

2. The sequential logical cell of claim 1, comprising:
   one or more protective MOSFET devices coupled between each of the four nets of the DICE, wherein the one or more protective MOSFET devices comprise:
   a first p-type MOSFET device comprising a gate, a first contact, and a second contact, wherein the gate is coupled to a high voltage level, wherein the first contact is coupled to the p-type drain contact area of the first net;
   a second p-type MOSFET device comprising a gate, a first contact, and a second contact, wherein the second contact of the first p-type MOSFET is coupled to the first contact of the second p-type MOSFET, and wherein the second contact of the second p-type MOSFET is coupled to one of the p-type drain contact area of the third net or a contact area adjacent to the p-type drain contact area of the third net;
   a first n-type MOSFET device comprising a gate, a first contact, and a second contact, wherein the gate is coupled to a low voltage level, and wherein the first contact is coupled to the n-type contact area of the first net; and
   a second n-type MOSFET device comprising a gate, a first contact, and a second contact, wherein the first contact of the second n-type MOSFET is coupled to the second contact of the first n-type MOSFET, and wherein the second contact of the second n-type MOSFET is coupled to one of the n-type drain contact area of the third net or a contact area adjacent to the n-type drain contact area of the third net;
   wherein the contacts of the additional MOSFET devices are placed along the first line.

3. The sequential logic circuit of claim 2, wherein the first contact of each of the first p-type MOSFET, the second p-type MOSFET, the first n-type MOSFET, and the second n-type MOSFET each comprise a drain, and wherein the second contact of each of the first p-type MOSFET, the second p-type MOSFET, the first n-type MOSFET, and the second n-type MOSFET each comprise a source.

4. The sequential logic circuit of claim 2, wherein the first contact of each of the first p-type MOSFET, the second p-type MOSFET, the first n-type MOSFET, and the second n-type MOSFET each comprise a source, and wherein the second contact of each of the first p-type MOSFET, the second p-type MOSFET, the first n-type MOSFET, and the second n-type MOSFET each comprise a drain.

* * * * *